(12) United States Patent
Shachar et al.

(10) Patent No.: US 7,313,973 B2
(45) Date of Patent: Jan. 1, 2008

(54) FLOW SENSOR AND FIRE DETECTION SYSTEM UTILIZING SAME

(75) Inventors: Yosi Shachar, Thornhill (CA); Yaron Panov, Thornhill (CA)

(73) Assignee: Global File Inc., Toronto (CA)

( * ) Notice: Subject to any disclaimer, the term of this patent is extended or adjusted under 35 U.S.C. 154(b) by 147 days.

(21) Appl. No.: 11/346,265

(22) Filed: Feb. 3, 2006

(65) Prior Publication Data

US 2006/0248961 A1    Nov. 9, 2006

Related U.S. Application Data

(60) Provisional application No. 60/649,579, filed on Feb. 4, 2005.

(51) Int. Cl.
*G01F 1/28*    (2006.01)

(52) U.S. Cl. .................................. 73/861.71

(58) Field of Classification Search ............ 73/861.71, 73/37; 169/56, 16, 37
See application file for complete search history.

(56) References Cited

U.S. PATENT DOCUMENTS

| | | | |
|---|---|---|---|
| 5,117,916 A | 6/1992 | Ohta et al. | |
| 5,165,465 A | 11/1992 | Kenet | |
| 6,037,867 A | 3/2000 | Joseph et al. | |
| 6,081,196 A | 6/2000 | Young | |
| 6,246,331 B1 | 6/2001 | McHugh et al. | |
| 6,314,792 B1 * | 11/2001 | Cain .............................. | 73/37 |
| 6,333,689 B1 | 12/2001 | Young | |
| 6,615,927 B1 * | 9/2003 | Kim .............................. | 169/37 |
| 6,648,077 B2 * | 11/2003 | Hoffman ....................... | 169/56 |

OTHER PUBLICATIONS

Piezo Films, Operating Properties for a Typical Piezo Film Element, www.pages.drexel.edu/~st96p2ha/piezo.html.
Kyowa, Strain Gages, A Complete Lineup of High Performance Strain Gages and Accessories, Cat. No. 101E-U1.
Entran, Featured Products: Pressure Senosrs, www.entran.com/featuredP.htm.
Multidirectional Target Flow Sensors using Conventional Resistive and Optical Fiber Strain Gauges, Developed by Rekha Chandy for her PhD project. 1993-1997, www.eng.livjm.ac.uk.Research/Groups/OFSRG/Flow.html.

(Continued)

*Primary Examiner*—Jewel Thompson
(74) *Attorney, Agent, or Firm*—Bereskin & Parr

(57) ABSTRACT

In a fire sprinkler system, flow sensors are used having strain gauges mounted on supports which project into the sprinkler pipes. When water flow occurs, the supports bend, changing the strain gauge resistance and producing a signal which can be analyzed to indicate which sprinkler heads are open. Since there are no mechanical switches, the sensor units are much smaller and cheaper than previously, and provide more information. A strain gauge can also or alternatively be located outside the pipe to detect vibration caused by flowing water. As an alternative to strain gauges, piezo film can be used, with a vibration analyzer to analyze the signal from the film to determine whether water flow is occurring and which sprinkler heads are open. A piezo film can also be placed on the pipe exterior and the signals from the two piezo films can be applied to differential inputs of a differential amplifier, to cancel signals caused by external influences such as pipe vibration. A thermistor can also be used to sense water flow, using temperature changes when the water begins to flow.

23 Claims, 7 Drawing Sheets

OTHER PUBLICATIONS

Sensor Transducer Applications, Turbine Blade Implants Measure at 32,000g, www.sensorland.com/AppPage027.html.

Axon Instruments, Shear Flow, Flow Meter and Fluid Ratio Tool, www.axonu-net.com/Shear%20flow.html.

CBG Corporation—Tool Description, www.cbgcorp.com/descriptions.html.

MDT Tool, www.earth.rochester.edu/issep/large.html.

Los Alamos Dynamic Stress Stimulation Laboratory for Enhanced Porous Fluid Flow Studies (DSSL), Abstracts from Moscow Conference on Elastic Wave Stimulation, Aug. 2002, www.ees.lanl.gov/Resurces/dssl.shtml.

Southwest Research Institute 2000 Annual Report, Fluid and Machinery Dynamics, www.swri.edu/3pubs/ar2000/fluid.htm.

Piezo Lab, Piezoelectronic Film Transducers, www.pages.drexel.edu/~st96p2ha/piezo.html.

Interfacing Piezo Film to Electronics, www.amp.com/products/technology/articles/interface.stm.

StrainSense, Making Sense with Senosrs, www.strainsense.co.uk/ProductPage001.html.

Development of Computer Program for Fire Suppressant Fluid Flow, Final Technical Report, vol. 1, Kemal Tuzla, Thomas Palmer & John C. Chen, Leigh University and Ramu K. Sundram & Woon-Shin Yeung, Duke Engineering and Services, Inc., Sep. 2000.

* cited by examiner

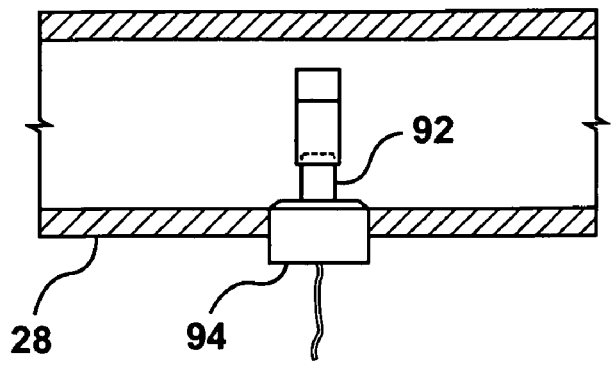
FIG. 17A
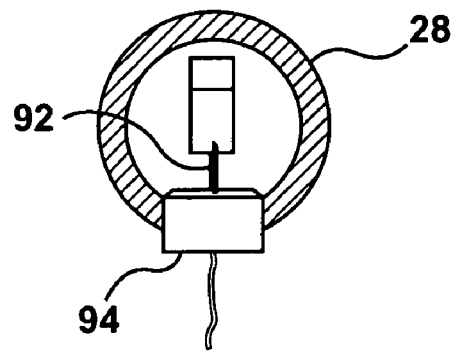
FIG. 17B
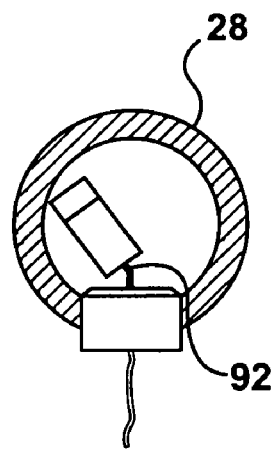 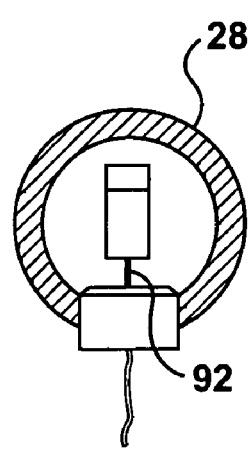 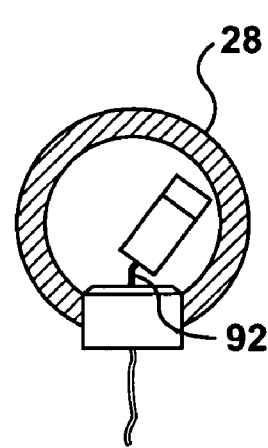
FIG. 17C  FIG. 17D  FIG. 17E

FLOW SENSOR AND FIRE DETECTION SYSTEM UTILIZING SAME

CROSS-REFERENCE TO RELATED APPLICATIONS

This application claims priority to U.S. Provisional Application No. 60/649,579 filed on Feb. 4, 2005, which is incorporated by reference herein in its entirety.

FIELD OF THE INVENTION

This invention relates to fire sprinkler systems, and more particularly to a system including water flow sensors used in fire sprinkler systems.

BACKGROUND OF THE INVENTION

Fire sprinkler systems commonly include water flow sensors which are intended to provide some information about the activation of sprinkler heads within the system. The water flow sensors that are currently used throughout the industry are mechanical devices which contain a moving paddle (located within the pipe) and a microswitch. If water begins to flow within the pipe, the water flow displaces the paddle, which activates the microswitch, sending a signal to the building control panel.

The mechanical sensors currently used are difficult to install, since they are large, and must be inserted from the top side of the pipe (which is not always accessible) in order to reduce clogging of the moving paddle from sediment in the water. In addition, the mechanical flow sensors must be installed in the proper direction with respect to the direction of water flow, since the microswitch used to trigger the device can only operate in one direction. The mechanical sensors can also operate only when there is a full flow of water in the pipe, and cannot detect lower water flow rates which may indicate leaks within the system. Further, the paddles sometimes break and impede water flow. In addition, the mechanical sensors used are very costly.

BRIEF SUMMARY OF THE INVENTION

In one aspect of the invention, an improved flow sensor is provided, which does not require a mechanical switch, and which is much less costly than the current mechanical flow sensors. Preferred forms of sensors according to the invention are smaller than the current mechanical flow sensors and can be installed in any orientation, so larger numbers of these sensors can be used to form a system which can provide more information to fire fighters and others than is feasible with the current system.

In one aspect, the invention provides a fire sprinkler system having a water pipe and a sprinkler head connected to said water pipe, a water flow sensor unit mounted on the pipe upstream of the sprinkler head for detecting water flow to the sprinkler head, the sensor unit comprising a sensor support, the sensor support being adapted to experience movement when there is water flow in the pipe, a sensor mounted on the sensor support and adapted to sense movement of such sensor support, a detector circuit connected to the sensor and responsive to sensing by the sensor of movement of the sensor support caused by water flow in the pipe to produce a detector signal, and a processing circuit for processing the detector signal to produce an alarm signal when the detector signal meets selected criteria.

In another aspect, the invention provides a sensor for sensing fluid flow in a conduit. The sensor includes a sensor base connected to the conduit, and a flexible stem connected to the sensor base. The stem experiences movement during fluid flow in the conduit. The stem includes a piece of piezo film adapted to produce a voltage upon movement of the stem, and a floater connected to a distal end of the stem. A counterweight is located at the tip of the floater.

Further objects and advantages of the invention will appear from the following description, taken together with the accompanying drawings.

BRIEF DESCRIPTION OF THE DRAWINGS

In the drawings:

FIG. 17A is a schematic view of the embodiment of FIG. 16A viewed in a longitudinal cross-section of pipe;

FIG. 17B is a schematic view of the embodiment of FIG. 16A viewed in a transverse cross-section of pipe; and FIGS. 17C-E are schematic views of the embodiment of FIG. 16A, viewed in a transverse cross-section of pipe, showing the oscillation of the sensor stem during flow conditions.

DETAILED DESCRIPTION OF PREFERRED EMBODIMENTS

Figure 1:
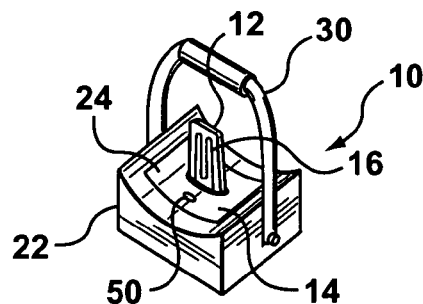
FIG. 1 is a diagrammatic perspective view of a flow sensor and accompanying electronics control box according to the invention.
Figure 2:
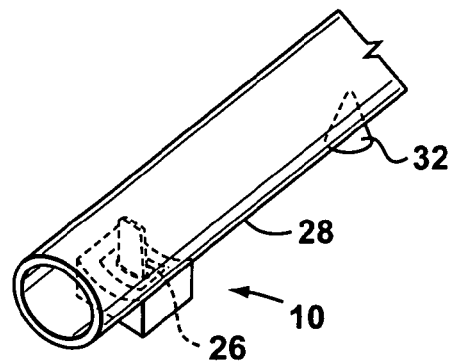
FIG. 2 is a perspective diagrammatic view of the flow sensor of FIG. 1 mounted on a fire sprinkler pipe.
Figure 3:
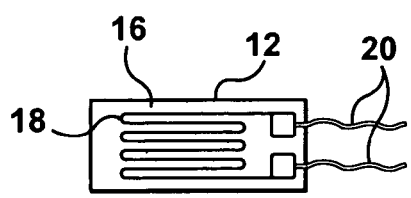
FIG. 3 is a plan view of a strain gauge used with the sensor of FIGS. 1 and 2.

Reference is first made to FIGS. 1 to 3, which show a flow sensor unit 10. Sensor unit 10 includes a flexible sensing element support 12 mounted on a base 14 and supporting a sensing element 16. In the embodiment being described, the sensing element 16 is a strain gauge. Strain gauges are readily available on the market and are made of a thin wire 18 arranged in a zigzag form (as shown in FIG. 3) to form a long electrically conductive strip bonded to a flexible backing (the support 12). When the support 12 is stretched (e.g. when it is bent), the wire 18 is stretched and its electrical resistance increases. The increase in resistance is a measure of the strain (i.e. amount of bending) present in the support 12. Leads 20 are typically connected to each end of the wire 18 which forms the strain gauge, and the leads are brought out to an appropriate amplifying and measuring circuit which detects and measures any change in resistance in the strain gauge.

In the embodiment of FIGS. 1 to 3, the support 12 is shown as projecting from a control box 22 into which the leads 20 extend. The control box 22 includes a sealing pad 24 (e.g. of a rubber material) surrounding the bottom of the support 12. In use, a hole 26 is drilled in a sprinkler pipe 28 (FIG. 2) and the control box 22 is pressed against the pipe 28 with the support 12 and strain gauge sensor 16 extending through the hole 26, and with the sealing material 24 sealing the hole 26. A suitable saddle or pipe clamp 30 connected to the control box 22 clamps and retains the control box 22 firmly in position on the pipe, with the strain gauge 16 positioned across the path of water flow in the pipe. Preferably, the sensor unit 10 is mounted upstream of one or more sprinkler heads 32, so that the sensor unit 10 can signal which sprinkler head or sprinkler heads have opened.

Figure 4:
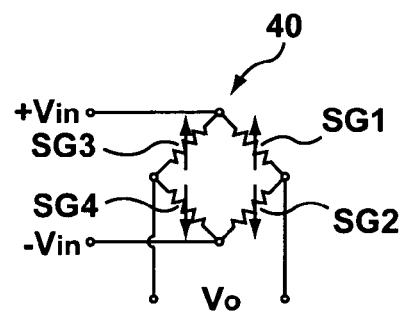
FIG. 4 is a schematic drawing of a full bridge employing strain gauges according to one embodiment of the invention.

As is well-known, the change in resistance in most commercially available strain gauges is very small for practical deflections of the support 12. In addition, the resistance of the strain gauge wire 18 is temperature dependent, and the resistance changes due to temperature changes can be greater than the resistance changes due to strain applied to the strain gauge. To deal with both these problems, strain gauges are commonly used in a bridge configuration. FIG. 4 shows four strain gauges SG1 to SG4 arranged in a full bridge configuration 40, with an excitation voltage of $V_{in}$ applied across the bridge. When the bridge 40 is balanced, the output voltage $V_o$ is zero. If there is a strain which changes the resistance in any arm of the bridge, $V_o$ will become a non-zero voltage. The full bridge 40 shown in FIG. 4 provides the best temperature stability (since resistance changes due to temperature are cancelled in opposite arms of the bridge) and the highest $V_o$ reading when strain is applied to all four strain gauges simultaneously. However, the FIG. 4 arrangement is costly since it requires four strain gauges.

Figure 5:
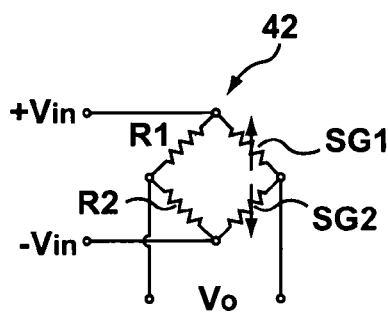
FIG. 5 is a schematic view of a half-bridge employing strain gauges according to one embodiment of the invention.

FIG. 5 shows a bridge 42 similar to that of FIG. 4, but with matched resistors R1 and R2 in two arms of the bridge, and strain gauges SG1 and SG2 in the other two arms. Applying strain (oppositely) to both gauges results in an unbalanced bridge and produces a non-zero $V_o$ output voltage. The FIG. 5 arrangement doubles the amplitude of the resistance change as compared with using a single strain gauge, and reduces sensitivity to temperature changes, since the temperature coefficients in the two strain gauges SG1, SG2 cancel each other.

Figure 6:
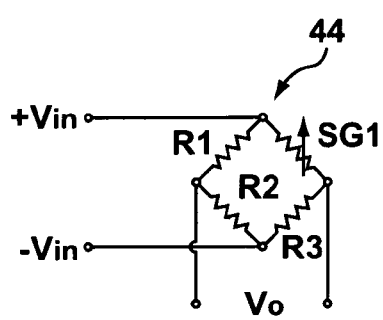
FIG. 6 is a schematic view of a quarter-bridge employing strain gauges according to one embodiment of the invention.

FIG. 6 shows resistors R1, R2, R3 in three arms of a bridge 44, and a single strain gauge SG1 in one arm. Applying strain to SG1 unbalances the bridge, providing a non-zero output $V_o$. FIG. 6 represents the lowest cost solution, but the circuit is temperature sensitive and provides the lowest $V_o$ reading in response to applied stress.

Referring again to FIGS. 1 and 2, to compensate for temperature changes, a thermistor 50 can be mounted on the control box 22 to project into the pipe 28. The thermistor 50 can sense temperature changes in the water flowing through the pipe 28. Such temperature changes will commonly occur after a sprinkler head opens, since the standing water in the pipe (which may have been at or near room temperature) is rapidly replaced with flowing water, which may be much cooler. The temperature information sensed by the thermistor 50 can be processed in a control circuit (described below) to cancel changes in resistance of the strain gauge material resulting from temperature changes. The temperature information sensed by the thermistor can also be used to compensate for gradual temperature variations caused by changes in the weather and surrounding environment.

Figure 7:
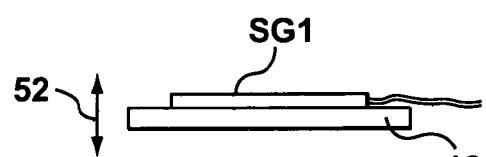
FIG. 7 is a side view of a sensor according to the invention using a single strain gauge.
Figure 8:
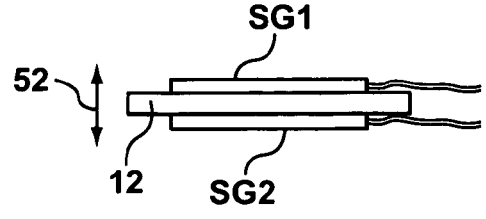
FIG. 8 is a view similar to that of FIG. 7 but using a double strain gauge.

FIG. 7 shows a single strain gauge SG1 mounted on a flexible support 12 (used in the FIG. 6 bridge configuration), while FIG. 8 shows two strain gauges SG1 and SG2, one mounted on each side of the support 12 (the FIG. 5 half-bridge configuration). With respect to the four strain gauge full bridge configuration of FIG. 4, the arrangement of the strain gauges on the support 12 is similar to that shown in FIG. 8, except that two strain gauges are located on each face of the support in side-by-side orientation. It will be understood that in all configurations of the strain gauge, the strain gauge or gauges used will be encapsulated in plastic, rubber or any other substance that insulates the gauges' wires from the water in the pipe.

In FIGS. 7 and 8, the direction of water flow in the pipe is indicated by arrow 52. For exemplary purposes, it is assumed that the strain gauge SG1 can be mounted in the pipe facing in either direction, so the arrow 52 is shown as double-ended. It will be realized that the single strain gauge SG1 shown in FIG. 7 is largely direction independent, i.e. it will bend essentially the same amount whether it is on the upstream or downstream face of support 12 (assuming that the support 12 is sufficiently thin). The double strain gauge embodiment shown in FIG. 8, using gauges SG1 and SG2, one on each side of support 12, is entirely independent of flow direction and will produce the same results no matter which way it is oriented with respect to flow. It will be evident that this greatly facilitates installation and eliminates the possibility of non-functionality because of a mistake in the direction of installation.

Figure 9:
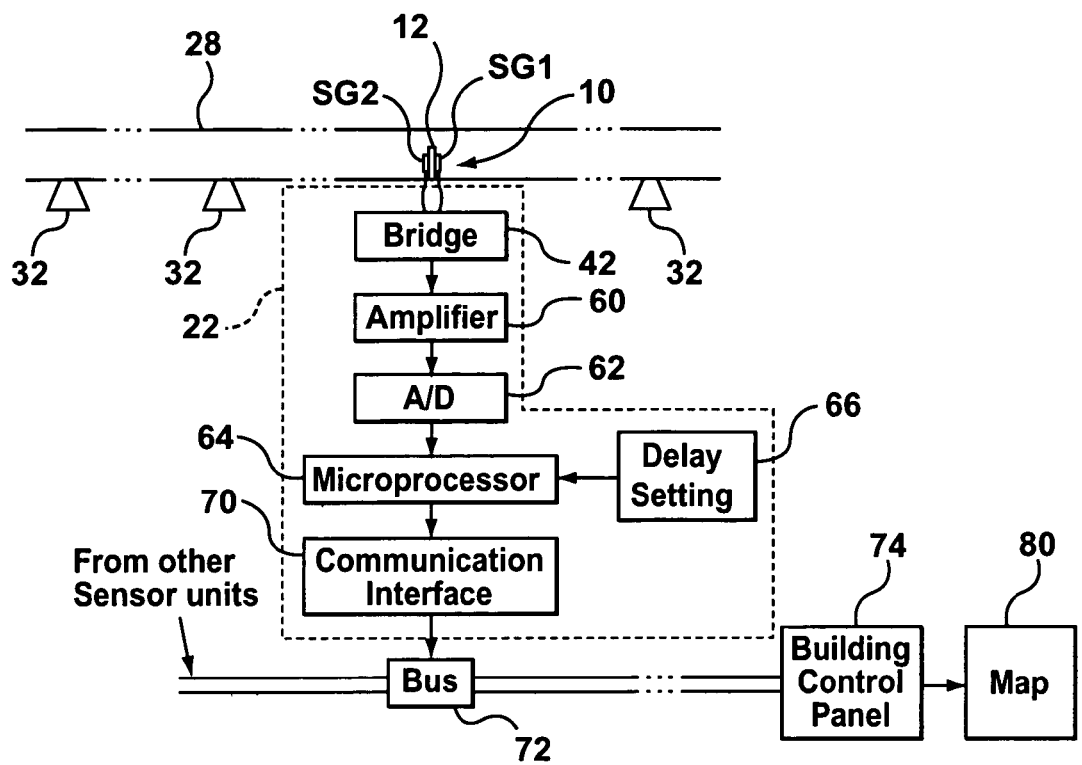
FIG. 9 is a block diagram showing a system for processing strain gauge signals according to one embodiment of the invention.

Reference is next made to FIG. 9, which shows a typical functional block diagram of a system for processing the strain gauge signals. It is assumed, for purposes of illustration, that a flow sensor unit 10 is installed upstream of the sprinkler heads 32 in each room of the building in question, as will be described.

As indicated in FIG. 9, the two strain gauges SG1 and SG2 are connected in the half-bridge configuration 42 of FIG. 5. The output voltage $V_o$ from the bridge is amplified in amplifier 60 and is then converted to digital form by A/D converter 62. These components are, as shown, located in the control box 22.

The digital signal from the A/D converter 62 is processed in microprocessor 64, which is equipped with a delay setting 66, so that brief transients or pulses in the water in the pipe will not create a false alarm. The microprocessor 64 can output several types of signals, for example an alarm signal when it detects full water flow through the pipe 28, and a different (e.g. leakage) signal when it detects leakage flow through the pipe 28. If a thermister 50 (not shown in FIG. 9) is used, its signal is also processed by microprocessor 64, to provide temperature compensation.

The output signal from the microprocessor 64 indicates whether or not full flow is occurring through flow sensor unit 10, and preferably also indicates (when there is no full flow) whether leakage flow is or is not occurring through the sensor unit. This output signal is optionally directed to a communication interface 70, which then outputs a signal on bus 72 to a building control panel 74. The signals from other flow sensor units in the building are also carried on bus 72 to the control panel 74. Thus, the control panel 74 will have (and can display) information showing each flow sensor unit which detects full flow, and showing in a different manner flow sensors which detect leakage flow. The communication interface 70 is not of course essential.

While the strain gauge or strain gauges used have been described as connected in a bridge configuration, and while this facilitates reading the strain gauge signal, it will be understood that use of a bridge configuration is not essential. For example, the strain gauge may be read directly, e.g. by connecting it in series to one or more resistors and then reading the voltage across the strain gauge using a suitably sensitive amplifier.

In one application, the information supplied to the control panel can be used to operate a building map, to indicate which sprinkler heads have been activated. An exemplary map is shown at 80 in FIGS. 9 and 10.

Figure 10:
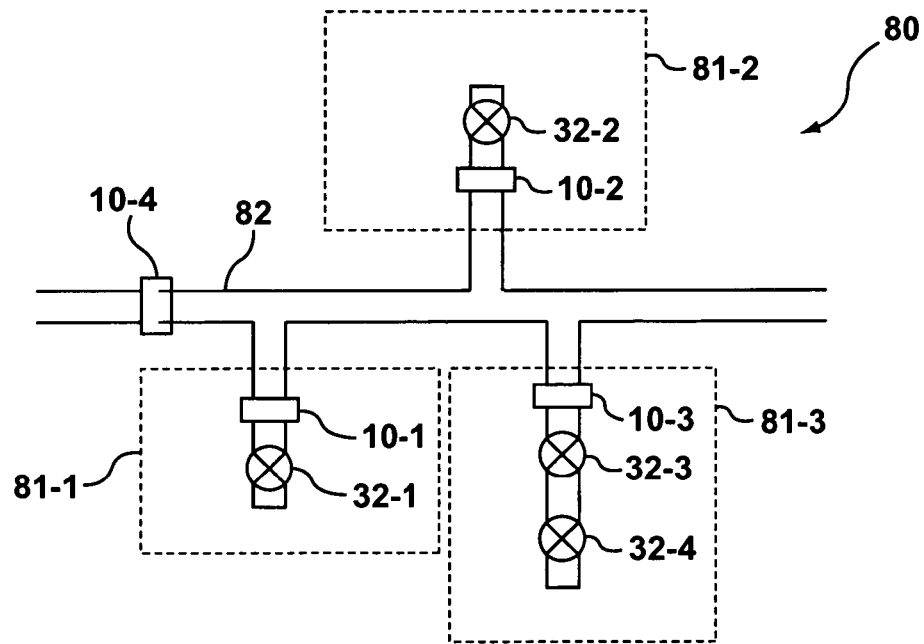
FIG. 10 is a diagrammatic view showing arrangement of sprinkler pipes, sprinkler heads and flow sensors in a building according to an embodiment of the invention.

In FIG. 10, three rooms indicated at 81-1, 81-2 and 81-3 are shown, with respective sprinkler heads 32-1, 32-2, 32-3 and 32-4, and flow sensors 10-1, 10-2 and 10-3 upstream of the respective sprinkler heads in each room. The sprinkler heads are supplied by a main floor feeder pipe 82, which is also equipped with a flow sensor indicated at 10-4.

In operation, if the sprinkler head in one room is open, causing water to flow, flow sensor 10-4 will indicate that there is an open sprinkler head. In addition, the flow sensor in the room where the open sprinkler head is located will also operate, showing that the sprinkler head in the room in question is open. This situation is displayed on the building map 80.

In some embodiments, it will not be necessary to indicate where on a floor a sprinkler head is open, but only to indicate that one or more sprinkler heads are operating on a floor. In that case, a simpler map can be displayed, or alternatively a multi-floor map can be displayed with all or several of the floors being shown at the same time, together with an indication of on which floors open sprinkler heads 32 are located.

Figure 11:
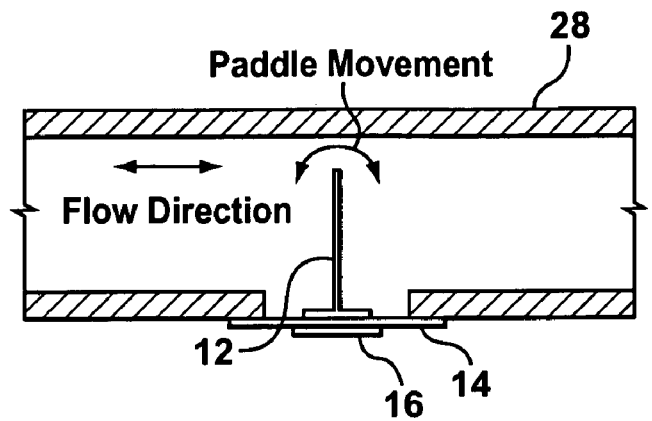
FIG. 11 is a diagrammatic view showing another embodiment of the invention with a strain gauge located on the outside of a pipe.

While the strain gauge sensing element 16 has been described and shown as being located inside the pipe 28, it is also possible to locate sensing element 16 outside the pipe. Reference is next made to FIG. 11, which shows a sensor arrangement similar to that of FIGS. 1 and 2 and in which corresponding numerals indicate corresponding parts. The major difference between the FIG. 11 embodiment and that of FIGS. 1 and 2 is that in the FIG. 11 embodiment the strain gauge 16 is not located on the flexible paddle 12, but instead is located on the outside surface of the sensor base 14 outside the pipe 28. As shown, the paddle or support 12 is mounted on support 14 inside the pipe 28 (protruding into the pipe). The base 14 is made of plastic, thin stainless steel or other flexible material and is clamped and sealed to the pipe 28 in any desired known manner, e.g. by circular clamps, not shown).

Figure 12:
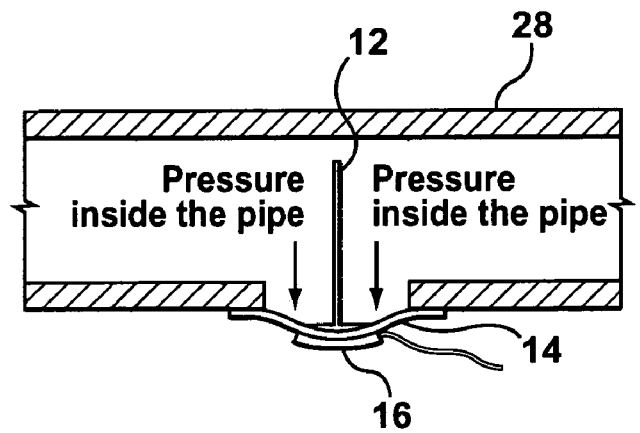
FIG. 12 is a view similar to that of FIG. 11 but showing the pipe pressurized and the strain gauge support warped outwardly.
Figure 13:
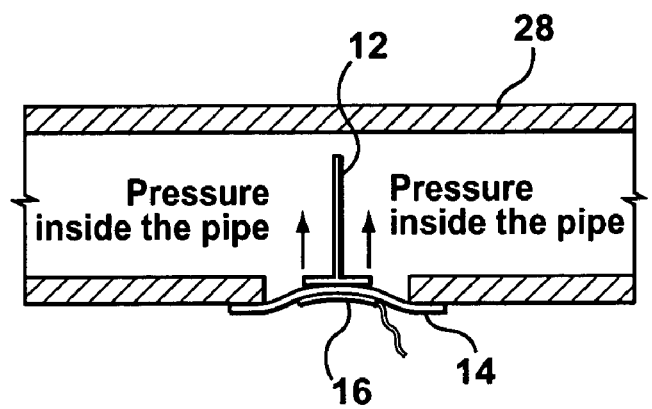
FIG. 13 is a view similar to that of FIG. 12 but showing the pipe depressurized and the strain gauge support warped inwardly.

In use, when the pipe 28 is pressurized, the base 14 (depending on its flexibility) will typically warp or curve outwardly slightly, warping the strain gauge in a given position as shown in FIG. 12. (The curvature is exaggerated for purposes of illustration.) When a sprinkler head opens, the pressure inside the pipe drops and the base 14 and strain gauge 16 warp or curve inwardly, as shown in FIG. 13, resulting in a changed resistance for the strain gauge and producing a signal. In addition, it is found that the flow inside the pipe 28 is usually extremely turbulent, and indeed, depending on the size and design of the paddle or support 12, the paddle may not bend in the direction of flow but may instead simply oscillate. The oscillations will be detected by the strain gauge 16 and will result in an alternative strain gauge signal which can be used to indicate that water flow is occurring inside the pipe 28.

One advantage of mounting the strain gauge 16 outside the pipe is that less rigorous measures are necessary to seal and encapsulate the strain gauge when it is outside the pipe.

When the strain gauge 16 is used to detect vibrations of the paddle 14, rather than steady bending of the paddle (or even if it is used to detect steady bending), it may be desirable to incorporate a time delay so that transient vibrations in the standing water in the pipe do not create a false signal that a sprinkler head has opened.

Figure 14:
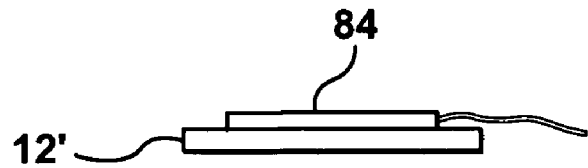
FIG. 14 is a side view of a sensor employing a piezo film according to one embodiment of the invention.

The foregoing description has described the sensor element as a strain gauge. However, other sensing elements can alternatively be used. For example, and as shown in FIG. 14, the sensing element 16' can be formed of piezo film 84 (also known as piezoelectric film) mounted on a support 12' which, as before, projects into the sprinkler pipe 28'. Piezo film is a flexible, lightweight, strong engineering plastic widely available in a variety of thicknesses. Piezo film has the characteristic that when it is bent, it produces a pulse of electricity. Therefore, in its simplest form, a piezo film requires no external power source, and it is able to generate signals much larger than those available from conventional strain gauges. Again, the piezo film can be located inside the pipe on the support 12', as shown, or alternatively, it can be mounted on the outside of the pipe where it can pick up vibrations from the support 12', as described in connection with FIG. 11 for the strain gauge.

Since piezo film, when bent or otherwise strained, does not produce a continuous signal, the support 12' is preferably designed so that the force and pressure of the flowing water cause the support 12' to vibrate or oscillate, thus creating a pulsating signal (as also described in connection with the strain gauge located outside the pipe).

Figure 15:
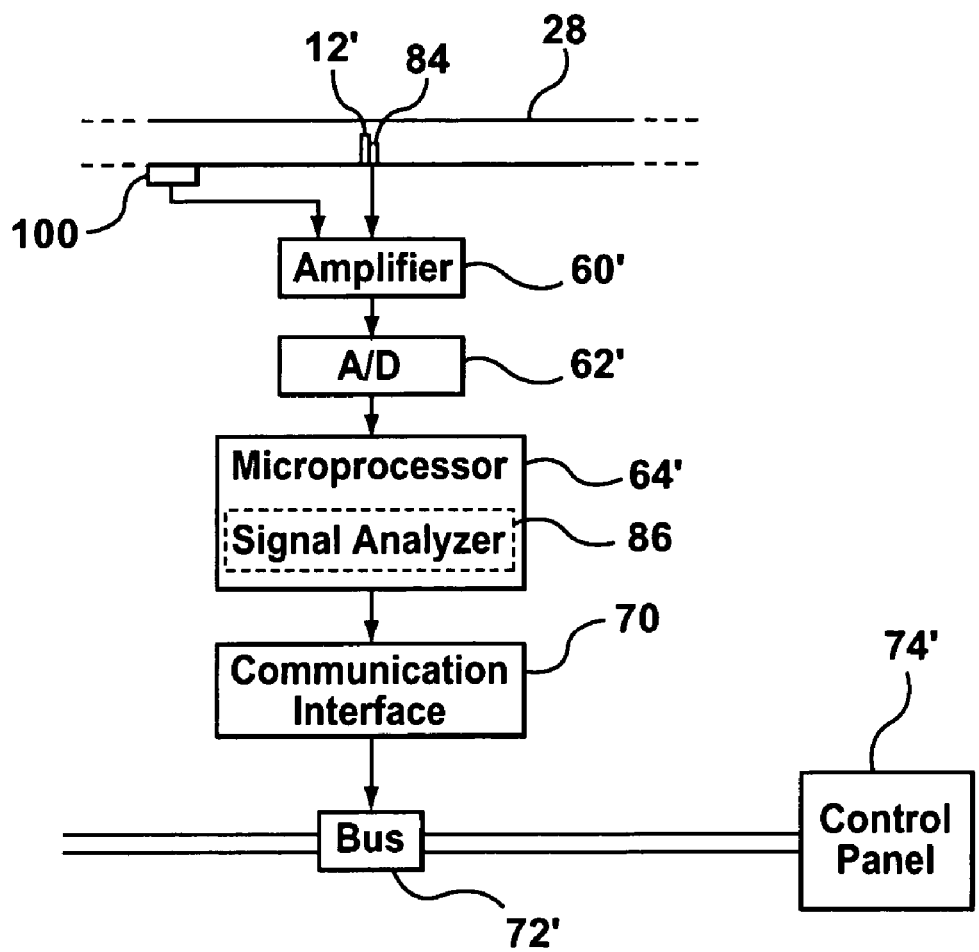
FIG. 15 is a block diagram showing a system for processing of a signal from the piezo film of FIG. 14.

As shown in FIG. 15, the pulsating signal from the film 84 is amplified by amplifier 60'. The amplified pulsating signal from amplifier 60' is converted to a digital signal by A/D converter 62', and is then processed by microprocessor 64' which now contains a signal analyzer 86. The signal analyzer 86 analyzes the signal from an analog/digital (A/D) converter 62' to look for signal components which are characteristic of flowing water in the sprinkler pipe 28', while filtering out signals resulting from transients, traffic vibrations and the like. If the microprocessor 64' detects a signal indicative of flowing water in the sprinkler pipe 28, it then sends a signal on the communication interface 70' and bus 72' to the building control panel 74' as before.

If desired, a thermister or other temperature sensing device can be used to provide temperature compensation for the piezo film.

If desired, and to eliminate the influence of external vibrations on the piezo film 84 (i.e. vibrations produced by vibrations of the pipe 28), a second piezo film 100 can be mounted on the external wall of the pipe as shown at 100 in FIG. 15. The internal and external piezo films 84, 100 are then connected to the differential inputs of a differential operational amplifier (amplifier 60' then being such an amplifier). This configuration cancels voltages produced by piezo film 84 as a result of vibrations of the pipe itself, while providing output generated by piezo film 84 from vibrations caused by the flowing water in pipe 28. The output of amplifier 60' will then indicate a water flow. With this arrangement, there will be less likelihood of false output signals due to external vibrations.

Where a differential amplifier is used, the signal analyzer 86 may not be required, or may be very simple, since the differential amplifier cancels signals produced by pipe vibration, so that any remaining signal from piezo film 84 will normally be due to flowing water (since the support 12' tends to vibrate in flowing water). Of course, some filtering may still be necessary, to eliminate voltages produced by pulses in the water.

Figure 16A:
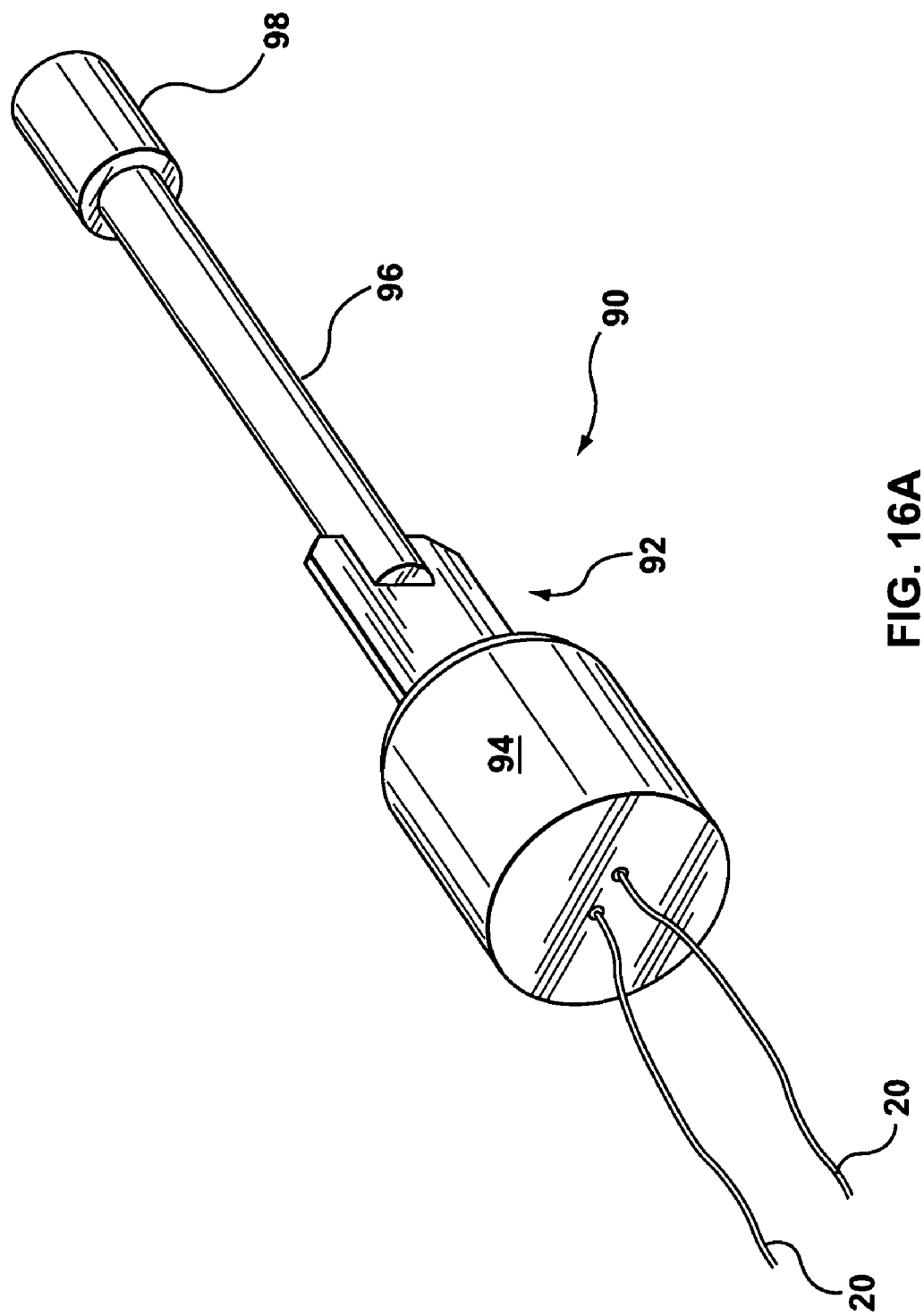
FIG. 16A is a perspective view of another embodiment of a flow sensor according to the present invention.
Figure 16B:
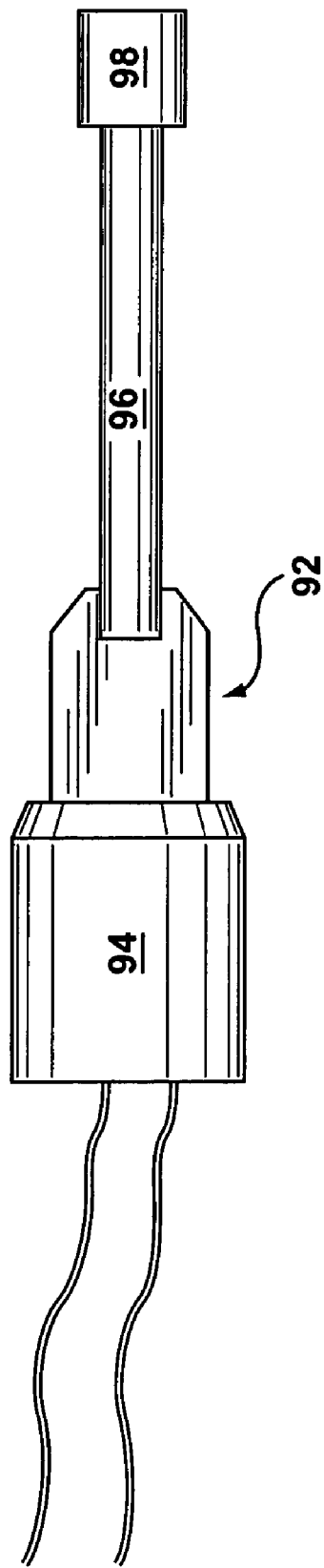
FIG. 16B is a plan view of the embodiment of FIG. 16A.
Figure 16C:
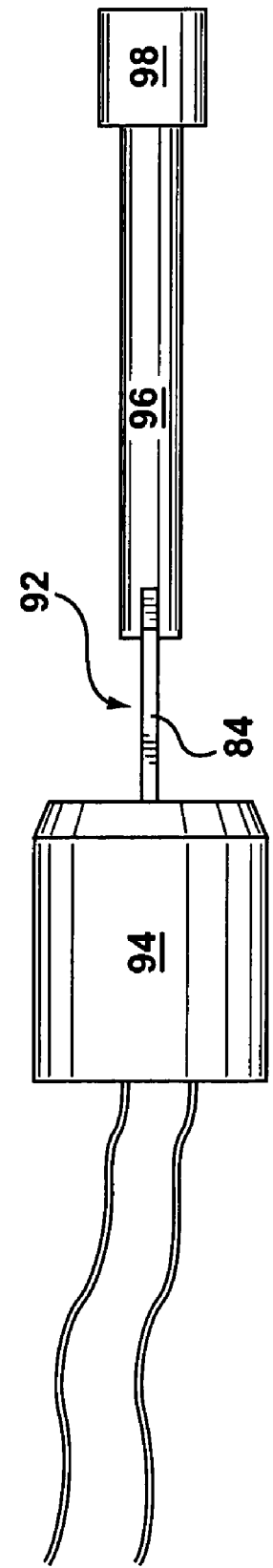
FIG. 16C is an elevation view of the embodiment of FIG. 16A.

FIGS. 16A-16C show another embodiment of a flow sensor 90. The sensor 90 includes a flexible planar stem 92 connected at its proximate end to a sensor base 94. The distal end of the stem 92 is connected to a floater 96 to urge the stem 92 away from the walls of the pipe 28 in the event the pipe 28 fills with water. The tip of the floater 96 includes a counterweight 98 which acts to center the stem 92 in the pipe 28.

The stem 92 is preferably composed of a piece of piezo film 84 encapsulated in a flexible plastic sheath. The encapsulated piezo film is commercially available from Measurement Specialties Inc. The encapsulated piezo film may be further coated by another compound in order to make it suitable for being submerged in water. One example of such a compound is rubberized silicone.

Referring to FIGS. 17A-E, the stem 92 is preferably oriented such that its planar surface is positioned longitudinally to the axis of the pipe 28. The orientation and construction of the sensor 90 in this embodiment permits the stem 92 to oscillate transversely to the longitudinal axis of the pipe 28 when water is flowing in the pipe 28 (as best shown in FIGS. 17C-E). The frequency and amplitude of the oscillations will depend on the flow rate of water through the pipe 28. Higher flow rate creates higher frequency oscillations, which generates higher output voltage from the piezo film 8b4.

The output voltage from the piezo film 84 in this embodiment may processed in a similar fashion as illustrated and described for FIG. 15 above. A predetermined threshold output voltage from the sensor 90 may be set to ignore low and random frequencies. This would increase the likelihood of avoiding false alarms and may obviate the need for the second piezo film sensor 100 (described above).

Instead of the strain gauge or piezo film sensors described, in some cases a simple thermistor such as thermistor 50 shown in FIG. 1 can be used as a flow detector, to indicate water flow. Normally when there is no flow, the temperature of the water in the pipe 28 stabilizes at a steady temperature, usually at or near room temperature. If a sprinkler head opens and water begins to flow, then the temperature of the water in the pipe flowing past the thermistor 50 tends to change rapidly. The rapid temperature change can occur for several reasons. For example, the water passing the thermistor has usually passed through several temperature zones as it travels through pipes in different parts of the building, resulting in temperature fluctuations. In addition, the water is often from a cool source (such as a lake or spring), so the temperature may drop as the cooler water reaches the thermistor. In this embodiment of the invention, a voltage or current is passed through the thermistor and the variation in this signal caused by a temperature change is detected and processed to provide a signal indicating that water flow is occurring. However, this method of detecting flow may be less reliable than using a strain gauge or piezo film, since it depends on variations of water temperature within the pipe, and such variations are not always well known or predictable.

While preferred embodiments of the invention have been described, it will be realized that various changes can be made, and all such changes are intended to be within the scope of the invention.

We claim:

1. In a fire sprinkler system having a water pipe and a sprinkler head connected to said water pipe, a water flow sensor unit mounted on said pipe upstream of said sprinkler head for detecting water flow to said sprinkler head, said sensor unit comprising a sensor support, said sensor support being adapted to experience movement during water flow in said pipe, a sensor mounted on said sensor support and adapted to sense movement of said sensor support, a detector circuit connected to said sensor and responsive to sensing by said sensor of movement of said sensor support caused by water flow in said pipe to produce a detector signal, and a processing circuit for processing said detector signal to produce an alarm signal when said detector signal meets selected criteria.

2. Apparatus according to claim 1 wherein said sensor is a strain gauge.

3. Apparatus according to claim 2 wherein said sensor support includes a support portion projecting into said pipe, said support portion having two sides, and said sensor comprises two strain gauges, one mounted on each said side of said sensor support.

4. Apparatus according to claim 2 wherein said strain gauge is mounted on a surface of said sensor support outside said pipe.

5. Apparatus according to claim 3 wherein said two strain gauges are connected in a half-bridge configuration.

6. Apparatus according to claim 1 wherein said sensor is a piezo film.

7. Apparatus according to claim 6 wherein said sensor support is shaped to vibrate in the water flow in said pipe.

8. Apparatus according to claim 7 wherein said processing circuit is adapted to analyze said detector signal.

9. Apparatus according to claim 6 and including a second piezo film mounted on said pipe to vibrate with said pipe, said piezo film and said second piezo film producing first and second vibration signals respectively, and a circuit for producing a difference signal from said first and second vibration signals and for using said difference signal to produce said detector signal.

10. Apparatus according to claim 7, wherein said sensor support further comprises a floater located at a distal end of said sensor support, said floater comprising a counterweight located at a tip of said floater.

11. The sensor of claim 10, wherein said floater is adapted to center said sensor support in said water flow.

12. Apparatus according to claim 1 wherein said sprinkler system is located in a building, said apparatus including a map of at least a portion of said building and showing sprinkler head locations on said map, and including a display circuit for displaying on said map sprinkler head locations which are operating.

13. In a fire sprinkler system having a water pipe and a sprinkler head connected to said water pipe, a water flow sensor unit mounted on said pipe upstream of said sprinkler head for detecting water flow to said sprinkler head, said sensor unit comprising a sensor support, a thermistor mounted on said sensor support and projecting into said pipe, a detector circuit connected to said thermistor and responsive to variations in water temperature sensed by said thermistor resulting from water flow in said pipe to produce a detector signal, and a processing circuit for processing said detector signal to produce an alarm signal when said detector signal meets selected criteria.

14. Apparatus according to claim 13 wherein said sprinkler system is located in a building, said apparatus including a map of at least a portion of said building and showing sprinkler head locations on said map, and including a display circuit for displaying on said map sprinkler head locations which are operating.

15. A sensor for sensing a fluid flow in a conduit, the sensor comprising:
 a) a sensor base adapted for connection to said conduit;
 b) a flexible stem connected to said sensor base, said stem being adapted to experience movement during said fluid flow in said conduit, said stem comprising a piezo film adapted to produce a voltage upon movement of said stem; and
 c) a floater connected to a distal end of said stem, said floater comprising a counterweight located at a tip of said floater.

16. The sensor of claim 15, wherein said stem is adapted to project into said conduit.

17. The sensor of claim 16, wherein said stem is oriented perpendicular to said fluid flow.

18. The sensor of claim 16, wherein said floater is adapted to center said stem in said fluid flow.

19. The sensor of claim 16 wherein said stem has a planar shape oriented longitudinally to said conduit.

20. The sensor of claim 19, wherein said stem is adapted to oscillate transversely to said conduit.

21. The sensor of claim 15, wherein said conduit comprises a pipe for delivering water to a sprinkler in a fire protection system.

22. The sensor of claim 21, further comprising:
 a) an amplifier adapted to receive said voltage from said piezo film and to amplify said voltage;
 b) an A/D converter adapted to convert to a digital signal said voltage amplified by said amplifier;
 c) a microprocessor comprising a signal analyzer, said signal analyzer being adapted to filter out signals resulting from vibrations caused by sources other than said water flow; and
 d) a communication interface adapted to receive a communication from said microprocessor indicative of water flow in said pipe.

23. The sensor of claim 22, wherein said fire protection system is located in a building, wherein said sensor further comprises a map of at least a portion of said building and showing sprinkler head locations on said map, and including a display circuit for displaying on said map sprinkler head locations which are operating.

* * * * *